United States Patent [19]
Gelber

[11] 3,990,784
[45] Nov. 9, 1976

[54] COATED ARCHITECTURAL GLASS SYSTEM AND METHOD

[75] Inventor: Robert M. Gelber, Healdsburg, Calif.

[73] Assignee: Optical Coating Laboratory, Inc., Santa Rosa, Calif.

[22] Filed: June 5, 1974

[21] Appl. No.: 476,684

[52] U.S. Cl. .............................. 350/166; 428/432; 427/163; 427/165; 427/404; 427/419 R
[51] Int. Cl.² .................. G02B 1/10; B32B 17/06; B05D 5/06
[58] Field of Search ............... 117/71 R, 33.3, 211, 117/217; 350/164, 166; 427/162, 163, 164, 165, 166, 167, 168, 169, 404, 419; 428/432

[56] References Cited
UNITED STATES PATENTS

| | | | |
|---|---|---|---|
| 3,649,359 | 3/1972 | Apfel et al. | 117/71 R |
| 3,679,291 | 7/1972 | Apfel et al. | 350/164 |
| 3,758,185 | 9/1973 | Gelber | 117/71 R |
| 3,781,089 | 12/1973 | Fay et al. | 117/33.3 |

*Primary Examiner*—Cameron K. Weiffenbach
*Assistant Examiner*—R. Eugene Varndell, Jr.
*Attorney, Agent, or Firm*—Flehr, Hohbach, Test, Albritton & Herbert

[57] ABSTRACT

Coated architectural glass system having a transparent substrate with a surface and a multi-layer coating disposed on the surface. The multi-layer coating comprises first and second metal layers and a dielectric layer disposed between the first and second metal layers. The first and second metal layers have a thickness ratio so that the transmission of the coating can be changed independent of its reflection properties, by varying the thickness of the metal layers while maintaining the ratio constant. The dielectric has a thickness such that the reflection from the coating is not strongly colored in the region of 400 millimicrons to approximately 700 millimicrons. In the method, the transmission of the coating can be changed merely by varying the thickness of the first and second metal layers in accordance with a thickness ratio.

24 Claims, 16 Drawing Figures

COATED ARCHITECTURAL GLASS SYSTEM AND METHOD

BACKGROUND OF THE INVENTION

Architectural glass coatings are utilized to control emissivity and for attenuating direct solar radiation. The emissivity of the coating governs the heat flow through the glass due to temperature differences between the inside and outside of the building. Architectural glass coatings have heretofore been provided for controlling these two properties. In addition, there have been attempts to provide architectural glass coatings which are relatively attractive in appearance. With architectural glass coatings heretofore provided, the coatings generally have a symmetric appearance, i.e., they have the same color on the outside of the building as they do on the inside. If they are reflective on the outside, they are also reflective to about the same degree on the inside. There have been a number of objectionable features to such coatings for architectural glass. They include the objection of being symmetric in appearance, being strongly colored and being highly reflective. They are limited in the range of colors they can produce because of their simplicity. In order to get better performance, namely more colors, asymmetry and different reflection levels it has previously been necessary to use more sophisticated coatings. See U.S. Pat. Nos. 3,649,359 and 3,679,291. The problem with these more sophisticated coatings is that in order to change one of the properties of the multilayer coating, it has been necessary to completely re-design the multilayer coating. For example, five different coatings for architectural glass would require five distinct designs, each with its own set of materials, layers and production methods. There is, therefore, a need for a new and improved coating architectural glass system and method.

SUMMARY OF THE INVENTION AND OBJECTS

The coated architectural glass system comprises a transparent substrate having a surface with a multi-layer coating disposed on the surface. The multi-layer coating comprises first and second metal layers and a dielectric layer disposed between the first and second metal layers. The first and second metal layers have a thickness ratio so that the transmission of the coating can be changed merely by varying the thickness of the first and second metal layers in accordance with the ratio. The dielectric layer has a thickness such that the reflection from the coating is not strongly colored in the region of 400 millimicrons to 700 millimicrons. The coating is provided with an anti-reflection surface. When the anti-reflection surface faces the substrate, the dielectric layer between the first and second metal layers has a low index of refraction. When the anti-reflection surface of the coating faces away from the substrate, the dielectric layer between the first and second metal layers has a high index of refraction. By the method, it is possible to provide a wide range of performance parameters simply by changing the layer thicknesses within the basic design. The materials remain the same, the layer order stays the same and the production methods remain the same for all the products.

In general, it is an object of the present invention to provide a coated architectural glass system and method which utilizes a single basic design which can be utilized to produce a family of coatings for architectural glass with a wide variety of properties.

Another object of the invention is to provide a system and method of the above character in which first and second metal layers are provided with a dielectric layer between the same.

Another object of the invention is to provide a system and method of the above character in which the design interaction of the metal and dielectric layers is decoupled.

Another object of the invention is to provide a system and method of the above character in which an asymmetric coating is obtained in appearance and reflectance.

Another object of the invention is to provide a system and method of the above character in which the reflected color can be changed by providing an additional dielectric layer having a thickness in accordance with the desired color.

Another object of the invention is to provide a system and method of the above character in which with a single metal and a single dielectric material, the metal layers and the dielectric layer or layers may be varied as separate groups to control separate performance properties of the coating on the architectural glass.

Another object of the invention is to provide a system and method of the above character which only requires use of a single metal.

Another object of the invention is to provide a system and method of the above character in which nearly any metal may be used in the design without disturbing the dielectric layer or layers.

Another object of the invention is to provide a system and method in which only one or a single dielectric material is required.

Another object of the invention is to provide a system and method of the above character in which the basic optical package has very few layers.

Another object of the invention is to provide a system and method of the above character in which silicon dioxide is utilized as a dielectric.

Another object of the invention is to provide a system and method of the above character in which the transmission of the coating can be changed without substantially changing other characteristics of the coating merely by varying the thickness of the first and second metal layers in accordance with a thickness ratio.

Another object of the invention is to provide a system and method of the above character in which a single design can be provided for solving the desired spectral requirements for a coated architectural glass system.

Another object of the invention is to provide a system and method of the above character in which a wide variety of architectural glass products can be obtained with a single production set-up.

Another object of the invention is to provide a system and method of the above character in which common materials can be utilized for the architectural glass products.

Another object of the invention is to provide a system and method of the above character in which common production methods can be utilized.

Another object of the invention is to provide a system and method of the above character which can assimilate wide production tolerances.

Another object of the invention is to provide a system and method of the above character in which the coating can be reversed so that the anti-reflection surface faces the air rather than the substrate.

Additional objects and features of the invention will appear from the following description in which the preferred embodiments are set forth in detail in conjunction with the accompanying drawing.

DESCRIPTION OF THE PREFERRED EMBODIMENTS

Figure 1:
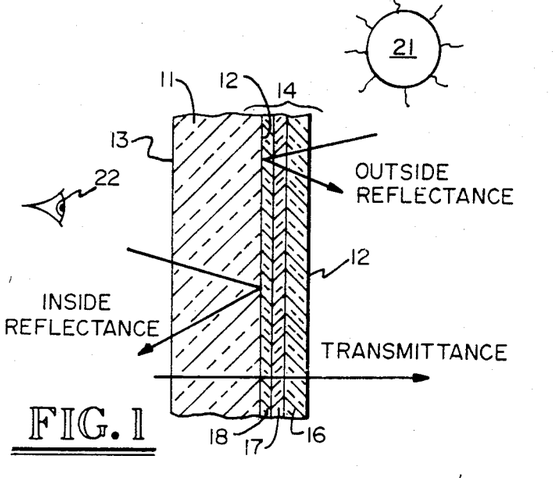
FIG. 1 is a cross-sectional view of an architectural glass system incorporating the present invention in which the coating is formed on the outer surface.

A coated architecutral glass system incorporating the present invention is shown in FIG. 1. It consists of a substrate 11 formed of a substantially transparent material such as architectural glass. Such a glass can have an index of refraction ranging from 1.50 to approximately 1.52. The glass substrate 11 is provided with an outer planar surface 12 and an inner planar surface 13 with its anti-reflecting surface facing the glass surface 12. A multi-layer coating 14 is disposed on the outer surface 12 with its anti-reflecting surface facing the glass substrate 12. The multi-layer coating 14 is basically a three-layer coating comprised of a thick metal layer 16, a dielectric layer 17 and a thin metal layer 18.

As hereinafter explained, the multi-layer coating 14 is self-matched or, in other words, it automatically anti-reflects itself. This is accomplished as long as the correct thickness ratio between the thick and thin metal layers is chosen along with the correct dielectric index and thickness as explained below. As hereinafter pointed out, it is believed that it is possible to utilize practically any optical metal for making up the thick and thin metal layers 16 and 18 as hereinafter described. The dielectric layer 17 can be formed of any suitable dielectric having an index of refraction ranging from 1.38 to 1.9. However, it has been found to be particularly desirable to utilize a dielectric having an index of refraction of 1.45. One material found to be particularly suitable and having such an index of refraction is silicon dioxide ($SiO_x$). Magnesium fluoride ($MgF_2$) can be utilized for the material having an index of refraction of 1.38 and yttrium oxide ($YO_2$) can be utilized for the dielectric material having an index of refraction of 1.9. One other material having an index of refraction between 1.38 and 1.9 which would be suitable is aluminum oxide ($Al_2O_3$) having an index of refraction of 1.65.

As can be seen from FIG. 1, the architectural glass 11 with the multi-layer coating 14 mounted thereon is positioned so that the outer surface 12 with the multi-layer coating 14 thereon faces the sun depicted at 21 and the inside surface 13 faces the interior of the building when looking at the architectural glass from a position represented by the eye 22.

Figure 6:
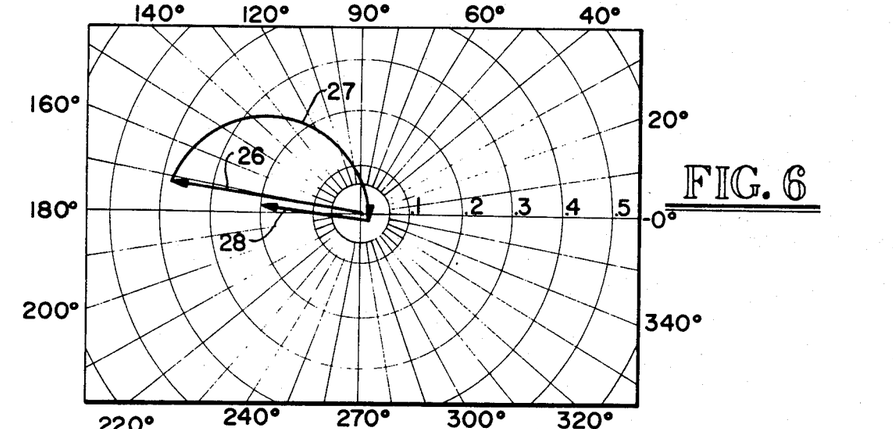
FIG. 6 is a polar coordinate graph of the coating design utilized in FIG. 1 as seen from the substrate side.

The function and use of the coated architectural glass can now be briefly explained as follows. The functions of the various layers 16, 17 and 18 of the multi-layer coating 14 can best be explained by reference to a circle diagram which is shown in the polar coordinate graph of FIG. 6. The use of circle diagrams is explained in an article entitled "Graphics in Optical Coating Design" by Joseph H. Apfel published in "Applied Optics" Vol. 11, page 1303, June 1972. In such circle diagrams the polar angle changes with phase shift of the reflected light. The polar coordinates extend from 0° to 360° in increments of 10° and a reflectance amplitude extending from zero to 1.0 in increments of 0.1. The square of the length of the vector gives a measure of the intensity of reflection. The circle diagrams are made by observing the coating from one side and starting with the layer of the coating most remote from the observer. Thus, in FIG. 6 and by observing as in FIG. 1, the diagram is started with layer 16. The circle diagram starts at air because layer 16 faces into air. The index of refraction of air which is 1.0 is represented as in the middle of the diagram. The first metal layer 16 is the thick layer and starts at zero and is represented by a vector 26 beginning at zero. The thickness of the layer 16 is represented by the length of the vector 26. The end or head of the vector 26 represents an amplitude reflectance of 0.38. The dielectric spacer 17 is represented by the vector 27 which starts at the end of the vector 26 and goes through approximately a 180° phase change and ends up at an amplitude reflectance of 0.02 and a phase shift of about 330°. The second thin metal layer 18 is represented by the vector 28 with the tail of the vector commencing with the head of the vector 27 and ending at a reflectance amplitude of 0.2 and a 180° phase shift, which is the amplitude reflectance of the massive glass substrate so that the coating is matched into the glass 11. It can be seen that layer 18 is approximately one-half the thickness of the first metal layer or, in other words, there is a predetermined thickness ratio as, for example, 2 to 1 between the thick layer 16 and the thin layer 18. Thus, it can be seen from FIG. 6 that a thick metal layer is followed by a dielectric spacer layer and is anti-reflected with a thin metal layer. Because of the relative positions of the metal layers in the amplitude reflectance plane, the second metal layer is approximately one-half the thickness of the first metal layer. The index of refraction for the dielectric required is approximately 1.45.

In the coated architectural glass system shown in FIG. 1, the multi-layer coating 14 is on the exterior surface 12 of the architectural glass and would be on an exterior surface of the building facing the sun 21 as shown in FIG. 1. There would be low inside reflectance looking from the inside of the building because the coating is matched into the glass as hereinbefore described. The reflection on the outside of the building would be substantially greater and generally would have the appearance of the metal utilized in the coating. Thus, if the metal normally has a silvery appearance, the coating would have a silvery appearance. In general, the simple coating shown in FIG. 1 would not have a color which would be substantially different from that of the color of the metal itself.

It should be appreciated that the thickness of the metal layers 16 and 18 can be changed without changing the thickness of the dielectric spacer as long as the change of thickness of both metal layers is by the same ratio. The coating will remain antireflected over a wide spectral band. This can be seen from FIG. 7 in which a plurality of examples are set forth showing this principle. It can be seen by incrementing both metal layers by the same percentage or by the same ratio, the circle diagrams show that the second metal layer returns to the same point in the circle diagrams indicating that the same antireflection is obtained with each of the coatings so that in effect there is provided a self-compensating design with a dielectric layer of substantially constant thickness. Thus, it can be seen that it is possible to retain the same antireflection qualities while at the same time providing a variable or adjustable transmission as determined by the thickness of the metal layers.

Figure 7:
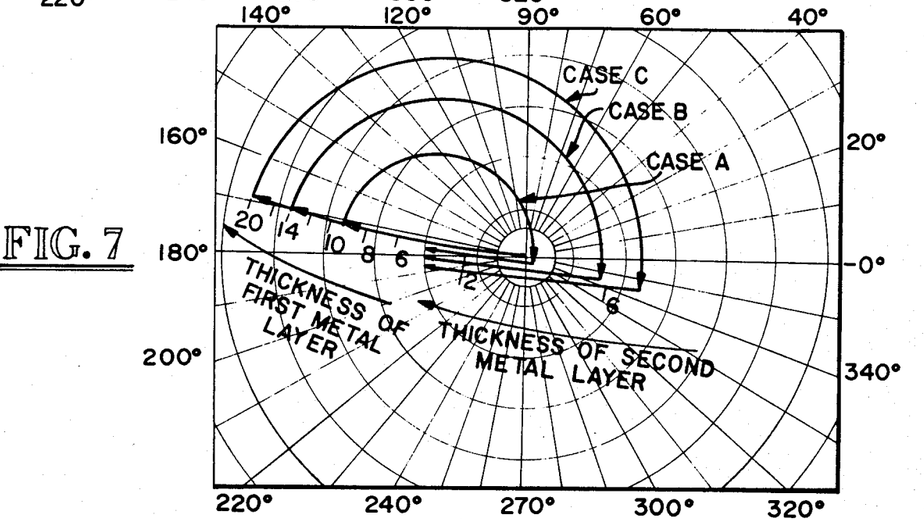
FIG. 7 is a polar coordinate graph showing that by utilizing the design in FIG. 6 and increasing the thickness of both metal layers in a predetermined ratio provides self-compensation while providing varying transmission.

By way of example, in making the circle diagrams in FIG. 7, nickel is utilized as a metal and silicon dioxide is utilized as a dielectric. The diagram is plotted for a wavelength of 550 nanometers which is the center of the visual spectrum. In case A shown in FIG. 7, starting from air, the first layer of metal has a thickness of approximately 9½ nanometers. A phase shift of 180° is provided by the dielectric layer. The second metal layer has a thickness of approximately 3½ nanometers so at the substrate the coating ends up at a reflectance amplitude of 0.2 and anaother 180° phase shift. In case B, 14 nanometers of metal are provided for the first metal layer. A 180° phase shift is provided with the use of a dielectric layer having the same thickness as in case A and then approximately 6½ nanometers of metal are provided for the second layer to again end up at a reflectance amplitude of 0.2 and the same phase. It can be seen that the ratio of the thickness of the two metal layers has remained the same. In other words, the thickness of both layers has been changed by the same ratio of approximately 3 to 1. In case C, the first metal layer has a thickness of approximately 20 nanometers, the thickness of the dielectric layer remains the same, and the second metal layer has a thickness of approximately 6½ nanometers to again end at the same reflectance amplitude and phase as in the other cases.

Figure 2:
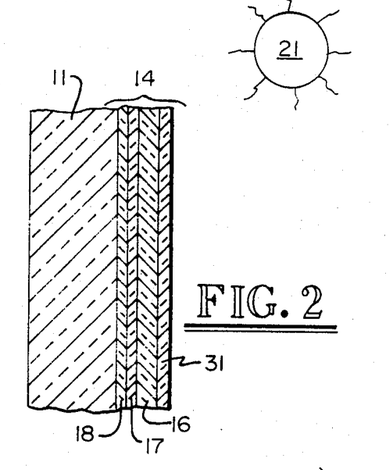
FIG. 2 is a cross-sectional view similar to FIG. 1 in which the coating has been provided with an additional dielectric layer to provide a desired colored appearance.
Figure 8:
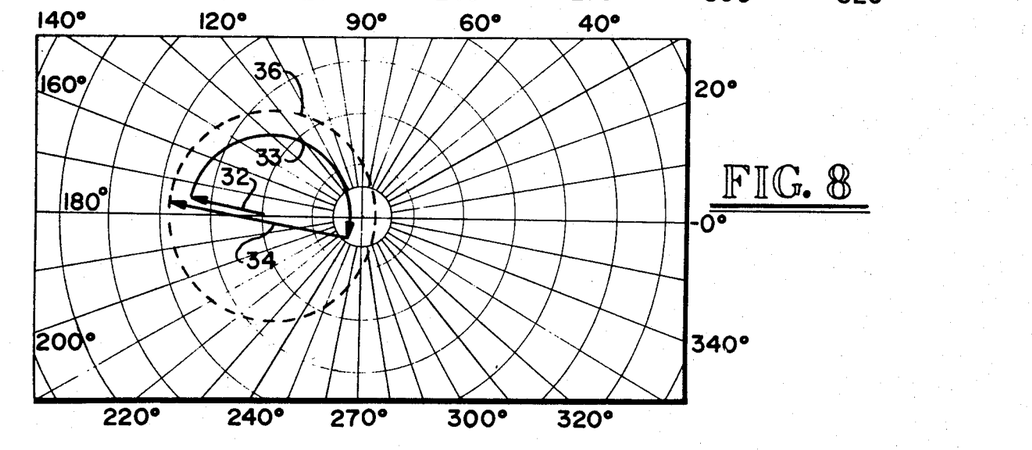
FIG. 8 is a polar coordinate diagram showing the coating design of FIG. 2 and the manner in which by varying the thickness of an additional dielectric layer, changes in reflected color are provided as seen from the air side.

By providing an additional dielectric layer 31 in the coating 14 as shown in FIG. 2, it is possible to introduce color as seen from the exterior of the architectural glass without changing the low reflection from the architectural glass on the inside of the building. In fact, the color on the outside of the architectural glass can be changed simply by changing the thickness of the outer dielectric layer 31 without the necessity of adjusting the dielectric spacer layer 17. The coating remains matched for any thickness of the color layer. This can be seen from the circle diagram which is shown in FIG. 8.

In examining this diagram, it should be remembered that one is looking at the architectural glass and the coating thereon from the outside. The first layer of the coating 14 which is considered is the layer 18 which is the farthest from the viewer. The layer 18 starts from the reflectance amplitude of 0.02 which is the complex index of refraction of a massive glass substrate as shown by the vector 32 in FIG. 8 with a length of 0.15, after which the dielectric layer or spacer layer 17 is added to bring the circle diagram to almost zero as represented by the vector 33 and thereafter, the thick metal layer 16 is added as represented by the vector 34 which is in phase with the vector 32 and extends slightly beyond the vector 32 such that when layer 31 is added, vector 36 passes close to the amplitude reflectance of air. Dielectric layer 31 is added with the desired thickness as represented by the plurality of vectors 36 which extend from approximately 180° through 360° back to approximately 180° to end up at the same point where the vectors 36 started. This makes it possible to obtain a complete range of colors. More than one complete revolution can be made in the circle diagram by the dielectric color layer 31 if desired to achieve a more saturated color. Generally, where earthy colors are desired, one revolution or less is desirable.

Figure 9:
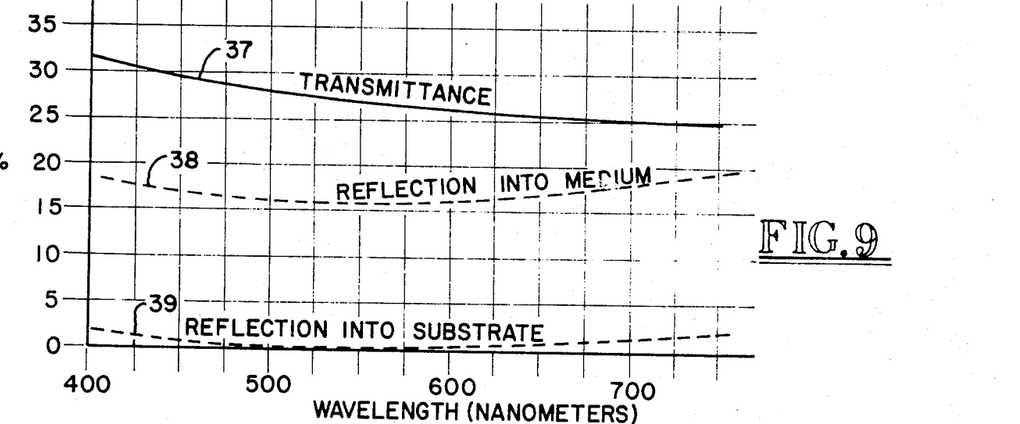
FIG. 9 is a graph showing the characteristics of the architectural glass system disclosed in FIG. 1.
Figure 10:
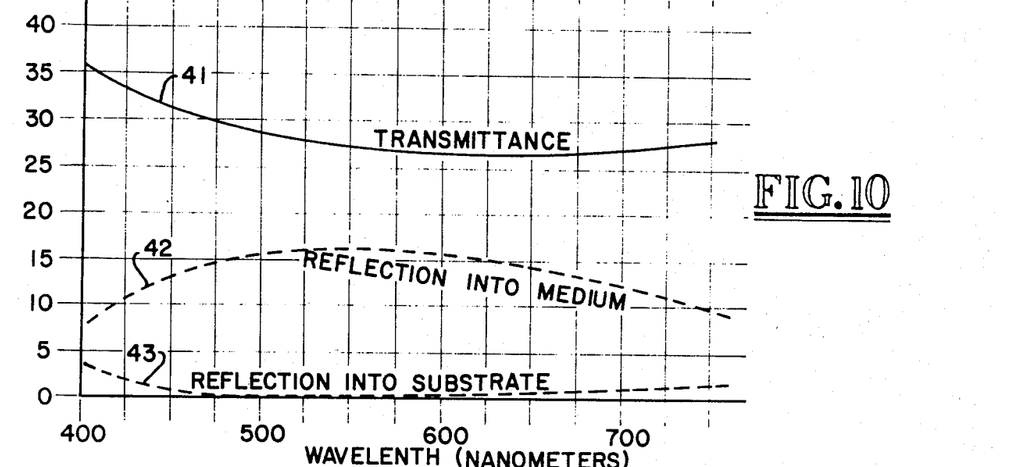
FIG. 10 is a graph of an architectural glass system of the type utilizing an additional dielectric color layer as shown in FIG. 2.
Figure 11:
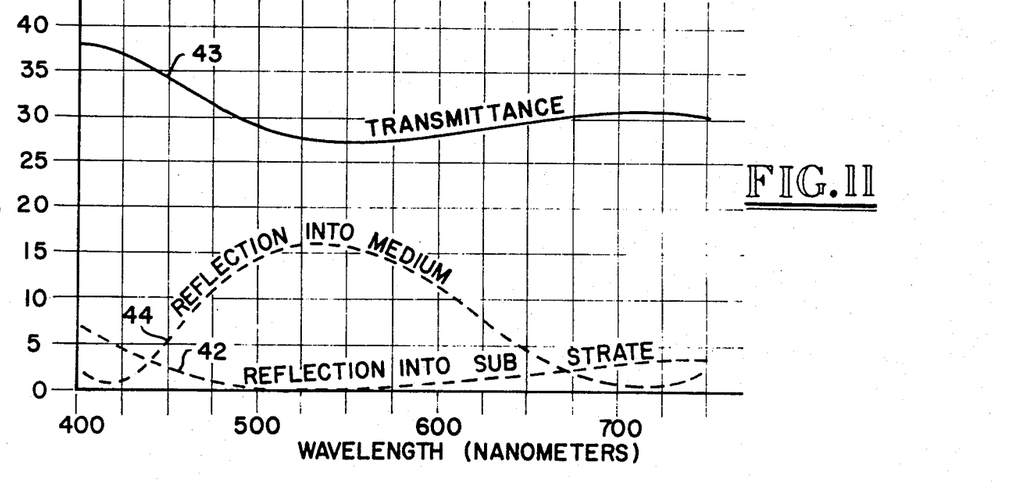
FIG. 11 is a graph similar to FIG. 10 but a thicker dielectric color layer.

In FIGS. 9, 10 and 11 are shown graphs of the results of particular designs of the architectural glass system utilizing the coating of the present invention. A table showing the values used for the curve shown in FIG. 10 is set forth below:

| INDEX OF MEDIUM 1.0000 | | | |
|---|---|---|---|
| LAYER | COMPLEX INDEX | PHYS THICK | Q-W OPT TH |
| 1 (16) | See note | 10.0000 | |
| 2 (17) | 1.4500    0.0000 | 88.4000 | 512.7200 |
| 3 (18) | See note | 4.0000 | |
| INDEX OF SUBSTRATE 1.5170 | | | |

Note: The optical constants for the metal can be obtained from a conventional handbook, or directly measured. For example, for nickel, they are as follows:

| $\lambda$ nanometers | $\eta$ $\begin{pmatrix} \text{real part of} \\ \text{index of refraction} \end{pmatrix}$ | | $\kappa$ $\begin{pmatrix} \text{absorption} \\ \text{coefficient} \end{pmatrix}$ |
|---|---|---|---|
| 400 | 2.17 | | 1.75 |
| 500 | 2.34 | | 2.17 |
| 600 | 2.57 | | 2.51 |
| 700 | 3.16 | | 2.55 |

As can be seen from the above table, only a three-layer coating is provided such as shown in FIG. 1 without a color layer. A start is made with the index of air at 1.0. Layers 1 and layers 3 are both formed of a metal such as nickel. Layer 2 is formed of silicon dioxide which has an index of refraction of 1.45 and a quarter wave optical thickness of approximately 513 nanometers. Thus, the layer 16 has a physical thickness of 10 nanometers, the layer 17 has a physical thickness of 88.4 nanometers, and layer 18 has a physical thickness of 4 nanometers. The index of refraction of the substrate is 1.5170.

A plot of the characteristics of this coated architectural glass system or structure is shown in FIG. 9. The solid curve 37 in FIG. 10 represents the transmission for the architectural glass system or structure from 400 to 750 nanometers. It shows that the transmission is substantially neutral and that the average transmission is approximately 27%. The broken or dotted line 38 represents the reflection into the medium which is air. It can be seen that this is relatively flat and averages approximately 17%. The reflection into the substrate which is represented by the broken or dotted line 38 is extremely low and, as can be seen, averages less than approximately 1%.

Thus, with architectural glass having a coating of this type, one from the outside of the building would see a substantially neutral or silver type color with a reflection of approximately 17%. On the inside, the appearance would be relatively neutral with practically no reflection. Thus, the reflection and appearance of both sides is asymmetric. The transmittance, as pointed out previously, can be varied as desired as, for example, from 5 to 90% by changing simultaneously the thickness of both metal layers in the same ratio as hereinbefore described. This change in transmission will not drastically change the reflected color from either surface or raise the back reflection.

An example of what occurs when the architectural glass system includes a color dielectric layer such as layer 31 in FIG. 2 can be seen from the example set forth below and the characteristics are the same which are plotted in FIG. 10.

| | INDEX OF MEDIUM 1.0000 | | |
|---|---|---|---|
| LAYER | COMPLEX INDEX | PHYS THICK | Q-W OPT TH |
| 1 (31) | 1.4500  0.0000 | 180.0000 | 1044.0000 |
| 2 (16) | See note | 10.0000 | |
| 3 (17) | 1.4500  0.0000 | 88.4000 | 512.7200 |
| 4 (18) | See note | 4.0000 | |

The color layer 31 has a quarter wave optical thickness of 1044 nanometers. Nickel was utilized for the metal and silicon oxide was utilized for the dielectric. The thicknesses of the other layers are the same as in the preceding sample.

In examining FIG. 10, it can be seen that the solid line 41 representing the transmittance of the architectural glass system or structure did not change appreciably from the transmittance curve 37 shown in FIG. 10. The average value is still approximately the same although slightly higher. Even though the transmittance curve 41 has a slightly greater curvature than the transmittance curve 37, this would not be visible to the human eye. The broken or dotted line curve 42 represents the reflection into the medium which is air and the broken or dotted line curve 43 represents the reflection into the substrate. It should be noted that the reflection into the substrate is substantially unchanged and even though there is a slight curvature upward in the curve in the blue region and the curve has gone down slightly in red, the differences also are so slight that they would not be noticed by the human eye. The characteristic which has changed significantly is the reflection into the medium which is the reflection from the outside of the building in which the architectural glass is mounted. The curve 42 shows that a yellowish-greenish color would be reflected into the medium with an average value of reflectance of approximately 13%.

An example of what occurs when a thicker dielectric colored layer is used is set forth in the table below and as shown in FIG. 11.

| | INDEX OF MEDIUM 1.0000 | | |
|---|---|---|---|
| LAYER | COMPLETE INDEX | PHYS THICK | Q-W OPT TH |
| 1 (31) | 1.4500  0.0000 | 360.000 | 2088.00 |
| 2 (16) | See note | 10.0000 | |
| 3 (17) | 1.4500  0.0000 | 88.4000 | 512.7200 |
| 4 (18) | See note | 4.0000 | |

From the above it can be seen that the color layer 31 is now twice as thick as the previous example shown in FIG. 10. Again, as can be seen from FIG. 11, the transmittance as represented by the curve 43 has not changed appreciably although it is slightly higher and has greater curvature than those shown in FIGS. 9 and 10. However, again these differences are so minor that they would hardly be noticed by the human eye. The reflection into the substrate also is still very low although the curvature has changed slightly. It has come up slightly further in the blue and has come up slightly in the red. These would not be particularly noticable to the human eye because the normal human eye has low sensitivity below 450 nanometers or above 650 nanometers. In examining the curves in FIGS. 9, 10 and 11 in this region, it can be seen there is substantially no change. The color from the outside, however, has been changed quite drastically as can be seen from the dotted line curve 44. It would give the appearance of a much deeper green or saturated greenish color although the overall reflectance from the exterior has not changed appreciably.

Figure 12:
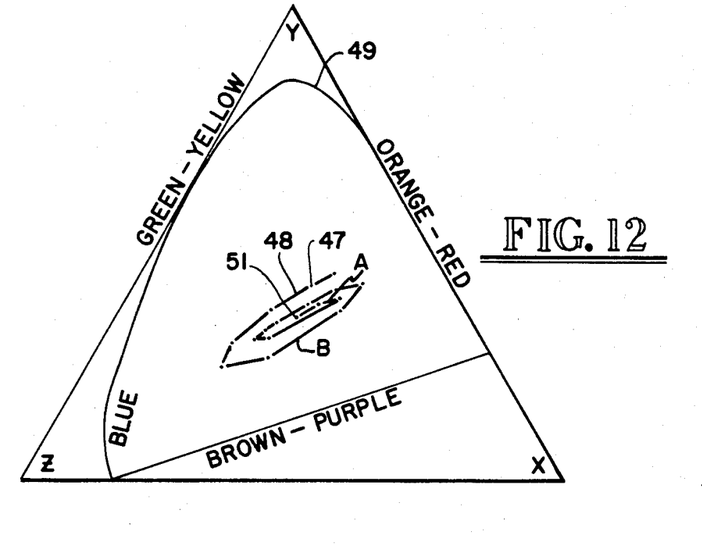
FIG. 12 is a graph showing the change in color as seen from outside the building as a function of thickness of the outer dielectric layer.

In FIG. 12 there is shown a chromaticity diagram which shows the manner in which a change in color is obtained as a function of thickness of the outer dielectric color layer 31. By examining this diagram, it can be seen that certain colors are easier to produce repeatably than others. Each data point, which is represented by a dot 47 in FIG. 12, represents a constant thickness increment in the dielectric color layer. The closer the data points in FIG. 12, the less color change there is for a change in dielectric thickness. These point plots 47 are joined by a curve 48 in FIG. 12. The horseshoe-shaped curve 49 in FIG. 12 is a plot of essentially dominant wavelength and saturation of the various colors. The dominant wavelength indicates the color and the saturation indicates the pureness of the color. Thus, if the saturation is low as, for example, 10 or 20%, the color of the dominant wavelength will be visible but it will not be very intense, whereas if the saturation is near 100%, the color is extremely pure and essentially monochromatic. By way of example, if earthy tones are desired, low saturation and not very high reflection are desired.

In order to ascertain the particular color of a coating, a line is drawn from the center point 51 through one of the points 47 until it extends through and intersects the horseshoe-shaped chromaticity curve 49. The intersection of this line and the chromaticity curve 49 gives the dominant wavelength and the distance from the center 51 gives the purity or saturation of the color. This shows that as the thickness of the color layer changes, the color which is obtained changes. The positions of the various colors are indicated in general on the chromaticity diagram in FIG. 12.

In addition, another factor can be readily ascertained from the chromaticity diagram shown in FIG. 12. For example, if a coating is picked which is near point A shown in FIG. 12, it will be noted that a certain thickness change in the coating will not change the color very much. This is apparent by drawing a line from the center 51 through the points 47 on opposite sides of point A. This also means that even if there were a relatively large error in the thickness of the color layer, there would be very little color change. This means that relatively large variations in thickness could be assimilated in production without noticeable color change. On the other hand, if a coating is picked which is near point B, it can be seen that by drawing two lines through two adjacent points 47 and the center point 51, the spacing between the two lines on the chromaticity curve 48 would be very large which would mean that the tolerance for this color layer would be relatively critical. In other words, a small error in the thickness of the color layer would lead to a large error in color. Thus, it is appropriate where possible to select colors in which there are relatively small changes in the color between two points 47 rather than large changes.

Figure 13A:
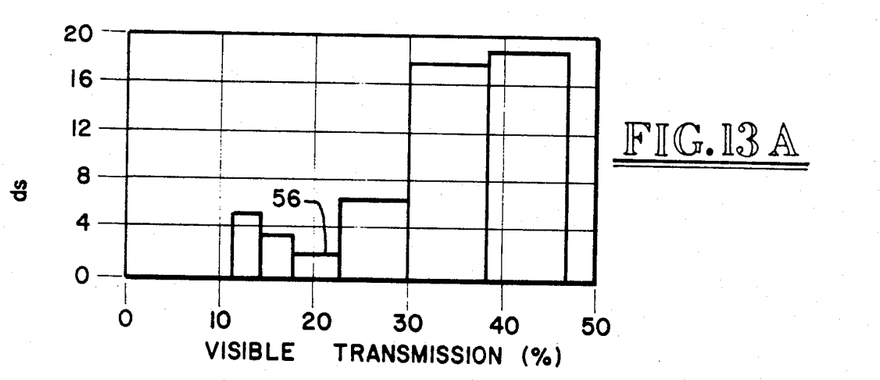
FIGS. 13A, 13B and 13C are graphs showing properties of reflected color from the surface of the coating of the architectural glass system.
Figure 13B:
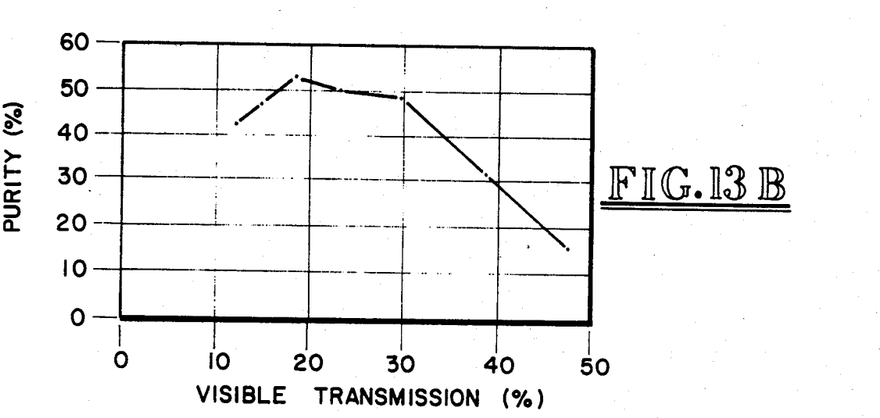
Figure 13C:
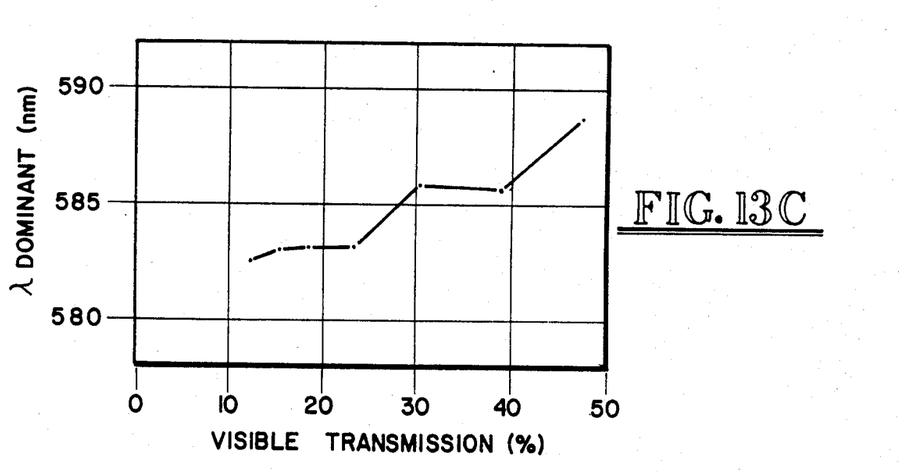

FIGS. 13A, 13B and 13C show the properties of reflected color from the coated surface of the architectural glass system. FIG. 13A shows the ds which, as is well known to those skilled in the art, represents the minimum perceptible color change which can be ascertained by the human eye. This is described by David MacAdam in Journal Optical Society of America, Vol. 33, Jan. 1943, p. 18, In FIGS. 13A, B and C, the thicknesses of the metal layers utilized in the coating were changed in direct proportion to ascertain what changes, if any, occurred in the dominant wavelength and purity of the color as seen from outside the building. From FIGS. 13B and 13C, it can be seen that the dominant wavelength changes very little — approximately 582 to 588 as the transmission changes from 12% to approximately 50%. Although the purity changes can be seen from FIG. 13B, the change is not very great. By way of example, taking from FIG. 13C a change in transmission from 18% to 23% and comparing these two percentages with the bar 56 shown in FIG. 13A, it can be seen that the color difference had a ds of 2. A value of ds 2.0 means 2 points are 2 times further apart than they need to be in order to be just discernibly different under strictly controlled laboratory conditions using side by side comparisons. It has been found that when two segments have been compared with a ds of approximately 5, it was barely possible to ascertain the difference under real world, non-laboratory conditions. The case with ds = 5 corresponded to a metal thickness change of approximately 13%, that is, by maintaining the metal controls to better than 13%, the resulting change in reflected color would be acceptable for that transmission region.

Utilizing the same type of analysis for the dielectric layer formed of silicon dioxide, a 10% variation in the thickness can be assimilated without appreciably changing the color.

In the event there is great concern as to the durability of the coating which is placed on the architectural glass substrate 11, the coatings which are shown in FIGS. 1 and 2 cannot merely be placed on the inside surface of the architectural glass because the coatings are arranged so that the outer layer is matched to the medium which is air and the inner layer is matched to the substrate. One way to protect the coating is to utilize double glazing. In the past, double glazing has been utilized for insulation purposes. In the embodiment shown in FIG. 3 it can also serve this purpose and, in addition, the additional layer 66 of glass having outer and inner surfaces 67 and 68 is provided as a part of the architectural glass system or construction. When this is the case, the coating 14 is placed on the outer surface 12 or the surface facing outwardly of the substrate 11 so that it has the same orientation as in FIGS. 1 and 2 before the two substrates 11 and 66 are assembled to provide a double glazing or twin window construction or system. An air space 69 is provided between the coating 14 and the inner surface 68 of the outer glass window or layer 66.

Figure 3:
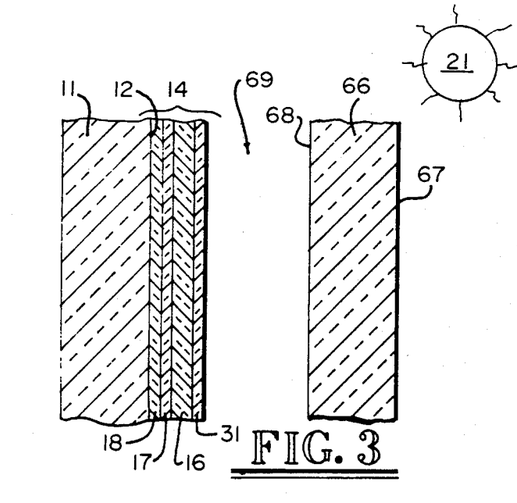
FIG. 3 is a cross-sectional view of the coating as shown in FIG. 2 showing the manner in which the coating can be protected by the use of double glazing.

The functioning of the construction shown in FIG. 3 is substantially identical to that shown in FIG. 2 with the exception that the light rays must penetrate an aditional glass layer 66. The transmission, however, will be essentially the same as will be the outside reflectance and the inside reflectance.

Figure 4:
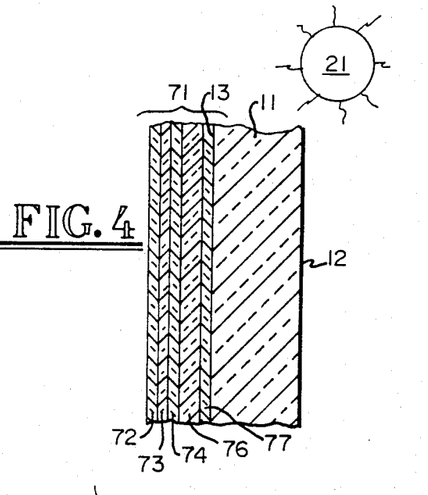
FIG. 4 is a cross-sectional view showing another embodiment of the present invention in which the coating is mounted on the inside surface of the architectural glass.

When it is desired to place the coating on the inside surface of the glass substrate 13 as shown in FIG. 4, it has been found that it is necessary to accomplish several things. First, the dielectric spacer must be formed of a material with a high index of refraction. Secondly, a quarter wave of low index material must be added over the thin metal layer and the ratio of thickness of the thick metal to the thin metal must be changed and for color a high index color layer must be provided. The coating 71 which comprises these layers is formed on the interior surface 13 of the glass substrate 11 and consists of a quarter wave dielectric layer 72 formed of a suitable low index material such as silicon dioxide which is added to the thin metal layer 73 to form the antireflection match to air. Without this layer 72, the reflection rises to approximately 10% in the blue and red spectral regions. With the dielectric layer, reflection is below 1.5% all across the visual spectral region.

In addition to the thin metal layer 73, there is provided a dielectric spacer layer 74, a thick metal layer 76 and a color dielectric layer 77 which is immediately adjacent the surface 13. The thin metal layer 73 and the thick metal layer 76 can be formed of any suitable metal in the same manner as the designs hereinbefore described. However, in order to add to the dielectric spacer layer 74, the thin metal layer must be made slightly thinner than in the designs hereinbefore described. Thus, it has been found necessary to change the ratio from above 2:1 to approximately 4:1 or more specifically the ratio of the thin to thick metal layer thickness is changed from 0.40 to 0.27.

For the dielectric spacer layer 74, it has been found that if a low index of refraction spacer material is utilized, it is possible to still obtain a good antireflection on the air surface. However, it has been found that washed-out colors are obtained on the other side which does not change much with changes in thickness of the color layer. It has been found that by utilizing high index material for the dielectric spacer layer, the design in the reflection space is shifted so that better colors are obtained on the color side by incrementing the color layer. The color layer 77 is also formed of a high index material because the color is produced on the substrate side. Therefore, the color layer must be formed of a high index material to have an effect when matched to glass.

The high index material for the color layer and also for the dielectric spacer layer can have an index of refraction ranging from 1.9 to 2.35.

Figure 14:
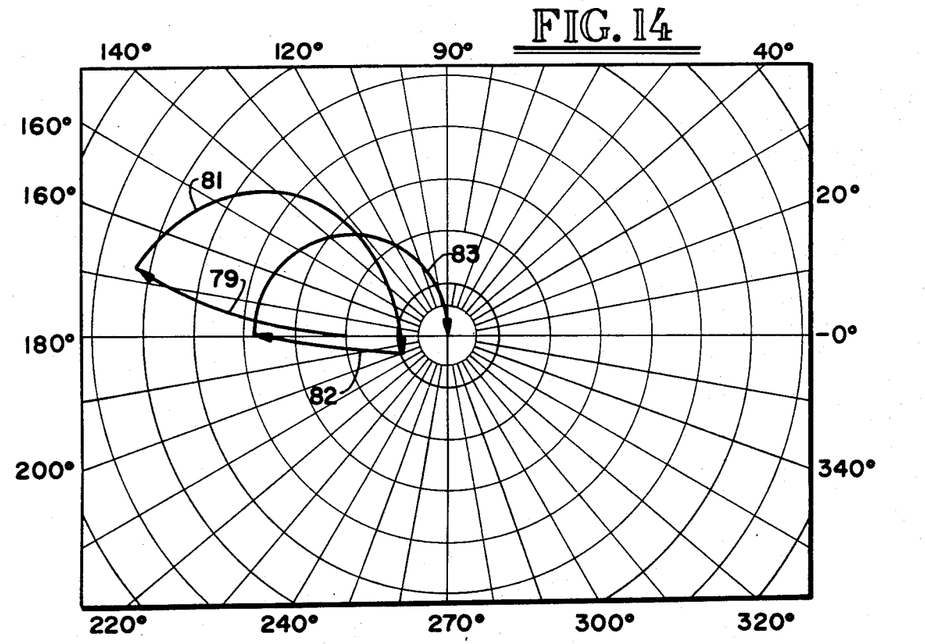
FIG. 14 is a circle diagram shown on a polar coordinate plot of the coating design shown in FIG. 4.

A circle diagram for a coating of this type is shown in FIG. 14 without a dielectric color layer. Thus, starting with the substrate having an index of refraction of approximately 1.5, a thick metal layer is provided of a suitable thickness as, for example, 27 millimicrons to provide a vector 79 representative of this layer. Thereafter, the dielectric spacer layer 74 formed of a high index material is provided which is represented by the vector 81. The material utilized was titanium dioxide ($TiO_2$) having an index of refraction of approximately 2.2. Thereafter, a thin metal layer is provided having a suitable thickness such as 7 millimicrons to provide the vector 82. An antireflection dielectric layer formed of a low index material such as silicon dioxide is provided having an index of refraction of 1.45 which again extends through approximately 180° as represented by the vector 83 to return to 0 which represents the index of refraction for air.

It has been found that after the above changes have been made with respect to the coatings shown in FIGS. 1 and 2 that the coating 71 can be placed on the interior surface of the glass. It has been found that even if a change in color is desired as seen from the outside of the building, this can be accomplished by changing the thickness of the color layer which now has a high index of refraction. The same thickness of dielectric spacer and the dielectric antireflection layer can be retained. If it is desired to change the transmission, the thickness of the metal layers can be changed in the necessary ratio without changing the thickness of any of the other layers in the coating.

Figure 5:
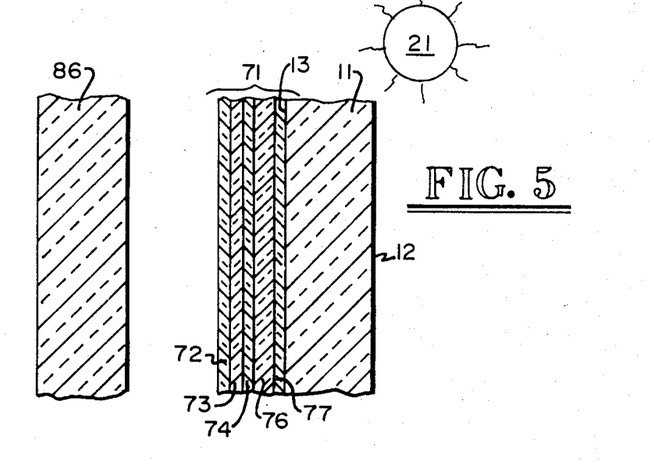
FIG. 5 is a cross-sectional view of an architectural glass system showing the manner in which the coating shown in FIG. 4 can be protected by using double glazing.

When it is desired to utilize this embodiment of the invention in a double glazing configuration, the coating is placed on the inside surface of the outer layer 11 of glass as shown in FIG. 5 in such a manner that there is an air space provided between the coating and the inner layer 86 of glass.

It is apparent from the foregoing that there has been provided a superior architectural glass system and structure and method for making the same. The product has a superior appearance over that which has been previously available. In addition, there is greater flexibility in the choice of colors and the types of performance trade-offs available.

The coated architectural glass system and structure permits independent control of reflected color and transmission level over a wide range of values. The design is relatively simple and requires few materials. The spectral properties of the system and design make it attractive for large scale production processes. The coating is of a type which can be deposited reproducibly by deposition or, alternatively, by sputtering.

I claim:

1. In a coated article, a substrate having a surface and a multi-layer coating formed on said surface, said multi-layer coating comprising first and second metal layers and a dielectric layer disposed between said first and second metal layers with said first metal layer being thinner than the second metal layer so that the solar transmission of the coating can be changed independent of the reflection properties of the coating by varying the thickness of the first and second metal layers while maintaining the ratio of thickness of the metal first and second layers substantially constant, said dielectric layer having a thickness such that the reflection from the substrate side is not strongly colored in the region of 450 to 650 millimicrons.

2. An article as in claim 1 wherein said reflection from the substrate side is less than 5%.

3. An article as in claim 1 wherein the coating has low reflection when viewed from the substrate side and wherein the dielectric layer disposed between the first and second metal layers has a low to medium index of refraction ranging from 1.38 to 1.90.

4. An article as in claim 1 wherein the coating has low reflection when viewed from the medium side and wherein the dielectric spacer layer between the first and second metal layers has a high index of refraction ranging from 1.90 to 2.35.

5. An article as in claim 4 wherein the coating includes a layer formed of a material having a low index of refraction and being disposed so that it is adjacent the first metal layer counting from the medium and on the side of the first metal layer facing the medium.

6. An article as in claim 3 wherein said material forming the dielectric spacer layer has an index of refraction of 1.45.

7. An article as in claim 4 wherein the dielectric spacer layer has an index of refraction of approximately 2.2.

8. An article as in claim 5 wherein the dielectric spacer layer has an index of refraction of approximately 2.2.

9. An article as in claim 1 together with an additional dielectric layer for changing the color of the reflectance of the article as seen from one side of the article.

10. An article as in claim 9 wherein the material forming said dielectric layer for changing color has a low to medium index of refraction.

11. An article as in claim 9 wherein said dielectric layer has a high index of refraction.

12. An article as in claim 1 together with an additional pane of glass facing the coating on the substrate for protecting said coating.

13. In an architectural glass system for use in a building having an inner enclosed area, a pane of glass having a first surface and a second surface and a multi-layer coating formed on said first surface, said multi-layer coating comprising first and second metal layers and a dielectric spacer layer disposed between the first and second metal layers, said first and second metal layers having a thickness ratio with said first metal layer being thinner than said second metal layer whereby the solar transmission of the coating can be changed by varying the thickness of the first and second metal layers in accordance with the thickness ratio of the first and second metal layers to change the solar transmission without appreciably changing the reflectance properties of the coating.

14. A system as in claim 13 wherein said first surface is adapted to face away from the inner enclosed area and wherein the coating is formed on said first surface with said first metal layer being closer to said first surface than said second metal layer.

15. A system as in claim 13 together with an additional dielectric layer formed on said second metal layer to provide a reflected color as viewed in looking toward the first surface of the pane of glass from the outside of the building.

16. A system as in claim 13 together with an additional pane of glass facing the coating on the pane of glass for protecting said coating.

17. A system as in claim 13 wherein said first surface faces inwardly of the building with the thicker of the metal layers being closer to said first surface and a dielectric layer formed on said thinner metal layer on the side facing away from said first surface, said dielectric layer on said thinner metal layer being formed of a low index material, said dielectric layer between said metal layers being formed of a high index material.

18. A system as in claim 17 together with an additional dielectric layer formed between the thick metal layer and the glass surface to provide a reflector color as viewed in looking toward the second surface of the pane of the glass.

19. A system as in claim 17 together with an additional pane of glass facing the coating on the pane of glass for protecting said coating on said first named pane of glass.

20. In a method for coating a substrate of the type which is substantially transparent and has an index of refraction of 1.50 to 1.52 and having a surface, deposition upon said surface first and second metal layers with a dielectric spacer layer of dielectric material disposed therebetween with the first metal layer being thinner than the second metal layer and varying the thickness of the first and second metal layers while maintaining the ratio of thickness of the first and second metal layers substantially constant to thereby change the solar transmission of the coating independent of the reflection properties of the coating, 21. A method as in claim 20 together with the step of adding an additional dielectric layer to said coating and changing the thickness of the additional dielectric layer to change the color of the coating as seen from one side of the substrate.

22. A method as in claim 21 together with the step of adding an additional dielectric layer adjacent the thinner metal layer to provide an anti-reflection match between the coating and air.

23. A method as in claim 21 wherein said dielectric spacer layer is formed of a low index material having an index of refraction ranging from 1.38 to 1.9.

24. A method as in claim 21 wherein said dielectric spacer layer is formed of material having a high index of refraction ranging from 1.9 to 2.35.

* * * * *